May 10, 1938.                L. MILLER                2,117,201
                          VEHICLE BUMPER
                       Filed Oct. 16, 1936
Fig. 1.
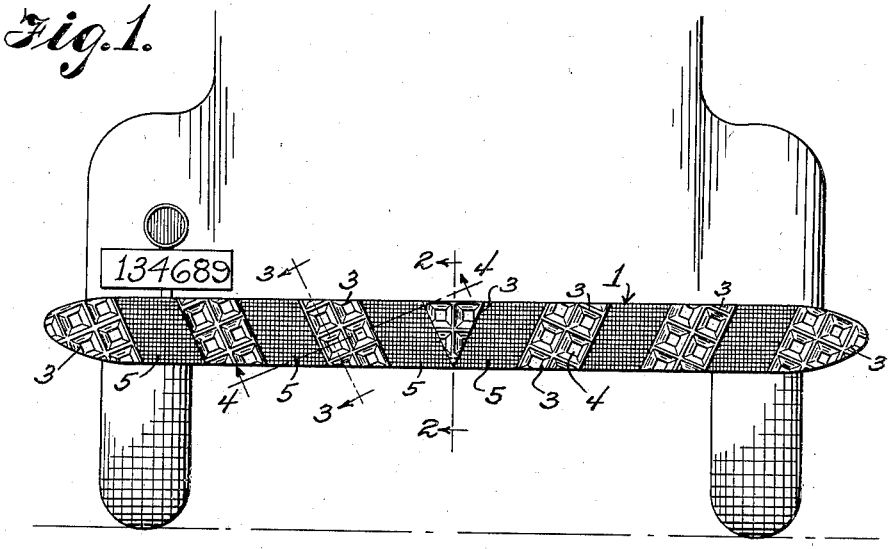
Fig. 2.   Fig. 3.   Fig. 4.
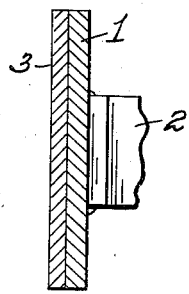 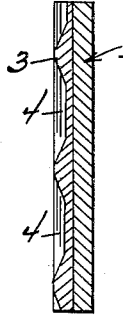 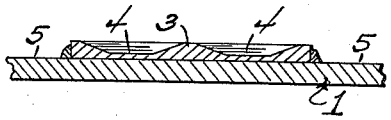
Lloyd Miller
INVENTOR
BY Victor J. Evans & Co
ATTORNEYS Patented May 10, 1938

2,117,201

UNITED STATES PATENT OFFICE 2,117,201

VEHICLE BUMPER

Lloyd Miller, North Webster, Ind.

Application October 16, 1936, Serial No. 105,999

1 Claim. (Cl. 88—81)

This invention relates to vehicle bumpers, and its general object is to provide a bumper that includes light reflecting surfaces to render the bumper clearly visible for a relative great distance especially at night, with the result the bumper not only acts as a protecting means for the vehicle carrying the same but as a safety device to indicate the presence thereof to approaching vehicles.

A further object is to provide a bumper of the character set forth, that has light reflecting surfaces, with dark surfaces or areas between the same, so that the visibility of the reflecting surfaces will be materially increased.

Another object of the invention is to provide a bumper of the character set forth, that is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a view illustrating the application of the bumper which forms the subject matter of the present invention, to the rear end of a motor vehicle.

Figure 2 is a sectional view taken approximately on line 2—2 of Figure 1, looking in the direction of the arrows.

Figure 3 is a sectional view taken approximately on line 3—3 of Figure 1, looking in the direction of the arrows.

Figure 4 is a sectional view taken approximately on line 4—4 of Figure 1, looking in the direction of the arrows.

Referring to the drawing in detail, and particularly to Figure 1, it will be noted that I have illustrated a bumper which is relatively wide and has reduced ends. However, the bumper can be of any shape suitable for the purpose intended, without departing from the spirit of the invention.

The bumper as shown includes a body bar 1 which is secured to the vehicle by bracket means 2, and of course can be secured to both the front and rear ends of the vehicle.

Fixed to the body bar at spaced intervals with respect to each other are plates 3 which are formed from light reflecting material, preferably bright or highly polished metal, such as chromium or the like.

I have illustrated a bumper having seven plates secured to the outer surface of the body bar, and the end plates follow the shape of the ends of the body bar and have inclined inner edges, while the center plate is shown as being of triangular outline, and the intermediate plates are disposed at a downward inclination, so as to provide a symmetrical arrangement or design with the other plates.

Each of the plates has formed thereon reflecting facets, provided by indentations of substantially truncated pyramidal shape, so that the light will be reflected therefrom in practically all directions. The areas or spaces of the body bar between the plates 3 are preferably enameled or painted black, and for distinction those areas are indicated by the reference numeral 5. It will be obvious that the black areas or surfaces increase the visibility of the reflecting surfaces, due to the contrast between the same.

From the above description and the disclosure of the drawing, it will be obvious that my bumper will be clearly visible for a relative great distance and is extremely advantageous for use on parked vehicles upon which all lights have been extinguished in that a parked vehicle equipped with my bumpers will be readily observed by approaching vehicles due to the reflection of the headlights of the latter within the reflecting surfaces of the bumpers.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A vehicle bumper comprising a body bar, light reflecting plates secured to the bar at regular spaced intervals thereon and extending from the upper to the lower edges thereof, said plates having substantially truncated pyramidal shaped depressions therein providing light reflecting facets, two of said plates being at the ends of the bar and following the shape of the end portions thereof, one of said plates being at the center of the bar and of triangular formation, the other plates having side edges directed at an inclination to follow the inclined edges of the center plate, and dark surfaces on said body between said plates.

LLOYD MILLER.